Figure 1:
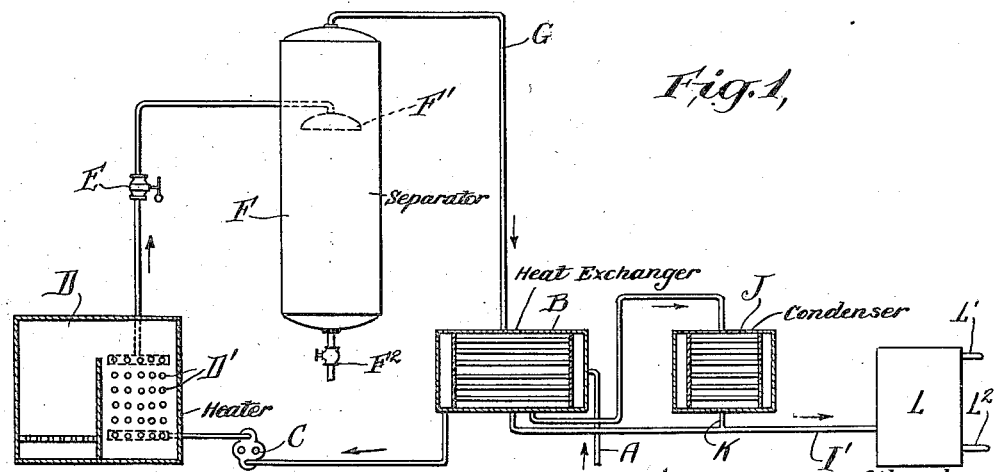

Patented Dec. 21, 1926.

1,611,370

UNITED STATES PATENT OFFICE.

JOHN PRIMROSE, OF RICHMOND, NEW YORK, ASSIGNOR TO POWER SPECIALTY COMPANY, OF NEW YORK, N. Y., A CORPORATION OF NEW YORK.

DEHYDRATING OIL.

Application filed June 28, 1923. Serial No. 648,269.

The general object of my present invention is to provide for the dehydration of oil, and particularly crude petroleum, with apparatus which is efficient in its heat requirements, and is characterized by its simplicity and relatively low cost of construction.

In carrying out my invention, I heat the wet oil under pressure and then pass it into a separating chamber in which the pressure is released, the pressure to which the oil is subjected while being heated, and the temperature to which it is heated, being such that appreciable vaporization will not occur in the heater, but when the pressure on the oil is released in the separator, all or a large portion of the water in the oil will burst into steam and separate from the unvaporized oil. The water vapor and such oil vapors as separate from the unvaporized oil in the separator, are withdrawn from the latter, and the heat of the vapors is utilized in preheating the oil passing to the heater in suitable heat exchanging apparatus, from which the uncondensed vapor residue is passed into a condenser, the condensate formed in the condenser and heat exchanging apparatus being passed to an oil and water separator.

The dehydrating operation may be an entirely continuous one, but in an advantageous mode of carrying out my invention, the operation is partly continuous and partly intermittent, in that the oil heater is supplied with wet oil first from one, and then from the other of two oil storage tanks. During the period in which each tank is connected to the oil heater that tank receives the unvaporized oil returned from the separator, the oil being continuously recirculated through the storage tank, heater and separator, until the oil in the storage tank is sufficiently dehydrated after which the oil heater is connected to the other storage tank to similarly dehydrate the oil therein. This recirculation of the oil through the oil heater and separator makes it possible to thoroughly dehydrate the oil without subjecting the latter to as high temperature or pressure in the oil heater as would be necessary to thoroughly dehydrate the oil in a purely continuous operation. Each of the storage tanks forms part of heat exchanging apparatus for utilizing the available heat in vapors leaving the separator in preheating the oil in the tank. In the regular operation of a unit comprising one oil heater, one separator and two storage tanks, some of the heat of the vapors generated in the dehydration of the oil in one storage tank is used in heating the oil contained in the other tank. Any vapors liberated from the oil in the preheating apparatus may be mixed with the vapor mixture from the separating tower and passed through the heat exchanging apparatus to the condensing apparatus.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated preferred embodiments of my invention.

Figure 2:
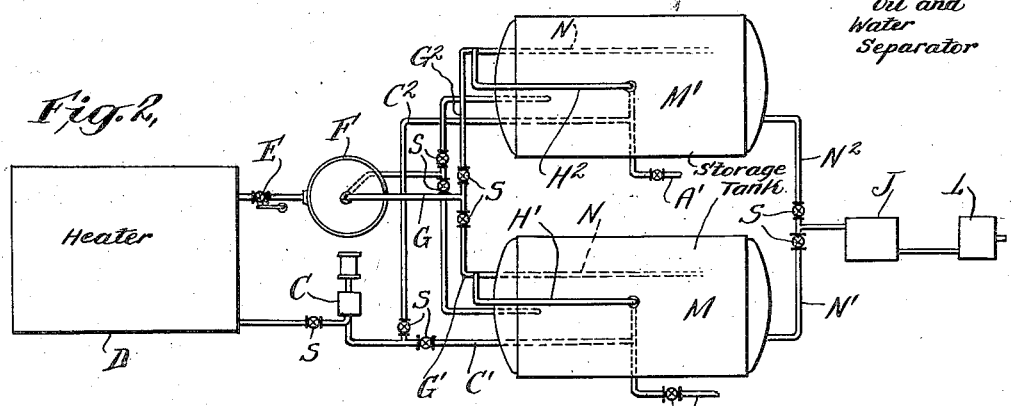
Figure 3:
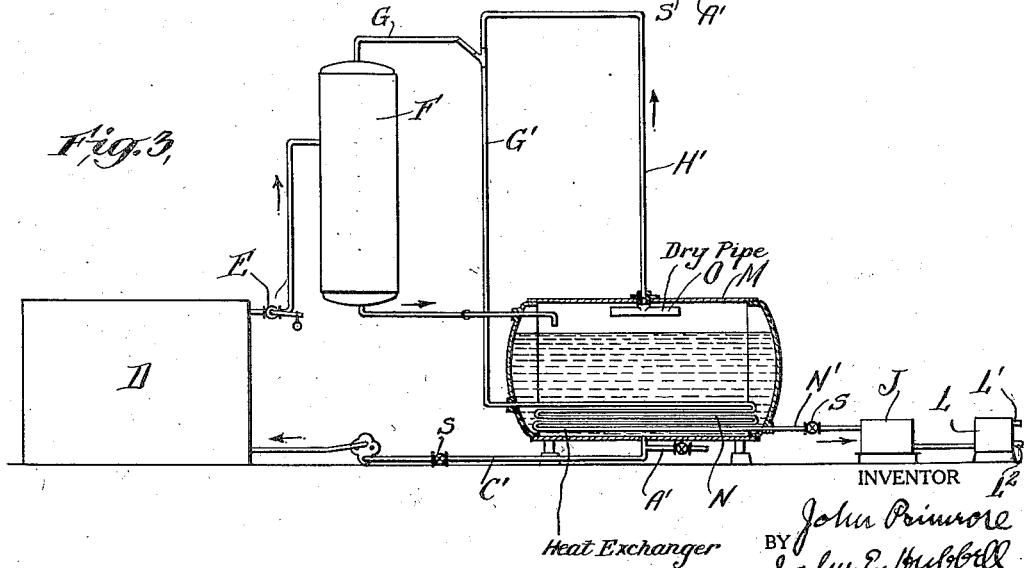

Of the drawings:

Fig. 1 is a diagrammatic elevation of apparatus for continuously dehydrating oil in accordance with the present invention; and Fig. 2 is a diagrammatic plan, and Fig. 3 an elevation of apparatus including provisions for recirculation of the oil treated through the oil heater.

In the apparatus illustrated in a somewhat diagrammatic and conventional manner in Fig. 1, the raw wet oil passes through the supply pipe A to a tubular heat exchanger B, from which the oil is passed by a pump C into the oil heater D. From the heater D the oil passes through a suitable back pressure valve E to the separator F, shown as a vertically elongated chamber into the upper portion of which the oil is discharged through the spray head F'. The dehydrated oil collecting in the bottom of the separator F is withdrawn through the valved outlet F² which may lead to a suitable oil storage reservoir, or directly to a cracking still or other oil refining apparatus. The water and oil vapors separating from the oil in the tower F, passes from the top of the latter through a conduit G into the vapor space of the heat exchanger B, which is shown as of tubular type with the oil passing through tubes traversing the vapor space. From the vapor space of the heat exchanger B the uncondensed vapors pass to the vapor space of a condenser J while the condensate formed in the heat exchanger B passes through the conduit I' to the oil and water separator L, which also receives the condensate discharge from the condenser J through the conduit K. The separator L may be of the usual gravity type with a bottom outlet $L^2$ for water, and a top outlet $L'$ for light oil. The oil heater D may be of any usual or suitable type for heating oil to the required moderate delivery temperature. Advantageously the heater comprises tubes $D'$ through which the oil is passed rapidly enough to avoid any substantial tendency to a gravity separation of the oil and water in the wet oil passing through the heater. The heater may be heated by the combustion of coal, oil or other fuel, and in some cases it may advantageously be heated in whole or in part by waste heat gases from oil cracking stills or other apparatus constituting an available source of waste heat gases.

In practice I contemplate ordinarily heating the oil in the heater D to a temperature not higher than 350° F. or so, thereby avoiding cracking temperatures, and minimizing the heat requirements of the apparatus. When the oil is heated to a temperature of 350° F., the back pressure valve E should be set to maintain a pressure of something like 350 lbs. per square inch, to avoid appreciable or significant vaporization in the oil heater. The separator F, heat exchanger B, and condenser J are preferably constructed and arranged so that the vapor pressure therein is approximately that of the atmosphere.

The apparatus shown in Figs. 2 and 3 differs from that shown in Fig. 1 essentially only in that the simple heat exchanger B of Fig. 1 is replaced by two storage tanks M and M' each of which contains a vapor coil N, and in that the apparatus of Figs. 2 and 3 comprises pipe connections and valves whereby the oil may be pumped into the heater D from either of the tanks M and M' at will, and the oil passed from the separator F back to the tank from whence it came, and the vapors may be passed to the condenser J from the top of the separator F through the coil N of either or both of the two tanks M and M'. The pipe connections shown in Figs. 2 and 3 for obtaining the desired oil and vapor circulation comprise a separate pipe connection $A'$ to each of the tanks M and M' through which the tank may be charged with wet oil and from which the dehydrated oil may be withdrawn; separate pipe connections $C'$ and $C^2$ from the tanks M and M' to the inlet of the pump C, and separate branches $G'$ and $G^2$ from the vapor outlet pipe G of the separator F, to the coils N in the tanks M and M'. The outlets for vapor and condensate from the two coils N are connected by separate pipes $N'$ and $N^2$ to the inlet of the condenser J. The vapor outlet piping from the separator F is separately connected to the upper portions of the tanks M and M' by branch pipes $H'$ and $H^2$, respectively, each of which is connected to a dry pipe O located in the upper portion of the corresponding tanks. Stop valves S are provided at approximate points in the various pipe connections.

In the contemplated operation of the apparatus shown in Figs. 2 and 3, each of the tanks M and M' may be initially filled with cold wet oil up to a level just below the dry pipes O therein. With the tanks thus charged, and assuming that the oil in the tank M is to be dehydrated first, the various valves S are adjusted as required to enable the pump C to pass oil from the tank M into the oil heater and to permit the oil collecting in the bottom of the separator F to flow back into the tank M. Initially all of the vapor from the separator F may be passed through the pipe G and the branch pipe $G'$ into the coil N in the tank M, and thence into the condenser J. This operation is continued until the body of oil in the tank M is heated by the coil N therein, and by admixture with the hot oil returning to the tank from the separator F, to a temperature so nearly that of the vapor passing into the coil N that the heat exchange between the vapor and the oil becomes undesirably low, after which the appropriate valves S are adjusted to cause the vapor leaving the separator F to pass through the coil N in the tank M'. To thus divert the vapor flow from one coil N to the other, it is necessary merely to close the valve S in the pipe $N'$ and open the valve S in the pipe $N^2$. The circulation of the oil from the tank M through the heater into the separator F, and from the separator back into the tank M is continued until the oil in the tank M is sufficiently dehydrated. When this occurs, the valves S in the pipes $G^2$ and $C^2$ are opened and the valves S in the pipes $G'$ and $C'$ are closed, thus starting the dehydration of the oil in the tank M'. When the tank M is thus disconnected from the pump C and the liquid outlet from the separator F, the dehydrated oil in the tank M may be withdrawn and the tank M again charged with cold wet oil. When thereafter the increasing temperature of the oil in the tank M' prevents an adequate transfer of heat to the oil in the tank from the vapor passing through the corresponding coil N, the valves S in the pipes $N'$ and $N^2$ are opened and closed, respectively, so that the vapor leaving the separating tower will then pass through the coil N in the tank M and thereby heat up the oil in that tank.

With the recirculation of the oil provided for, the oil in each of the tanks M and M' may be effectually dehydrated with a substantially lower temperature and pressure in the oil heater than would be required if the oil were dehydrated by a single passage through the oil heater and separating tower. This reduction in temperature and pressure in the oil heater correspondingly desirably reduces the evaporation of the oil, and the back pressure against which the circulating pump must work. Those skilled in the art will recognize that with either form of apparatus illustrated, when operated as described, oil may be effectively dehydrated with a relatively small heat consumption, and with apparatus which is simple, inexpensive and reliable as compared with apparatus heretofore used for the same purpose.

In each form of my invention illustrated I propose to condense most of the condensable oil and water vapor in the heat exchanger thereby recovering both latent and sensible heat from the vapors and reducing the required duty of the final condenser.

While in accordance with the provisions of the statutes, I have illustrated the best forms of my invention now known to me, it will be apparent to those skilled in the art that various changes in form may be made without departing from the spirit of my invention as set forth in the appended claims and that some features of my invention may sometimes be used to advantage without a corresponding use of other features.

Having now described my invention, what I claim as new and desire to secure by Letters Patent, is:

1. The method of dehydrating oil which consists in normally maintaining two bodies of wet oil, separately withdrawing oil from one body, heating it under pressure, reducing said pressure, separating the liquid from the vapor resulting from said reduction in pressure, and returning the liquid to the body of oil from which it was withdrawn until that body of oil is sufficiently dehydrated, abstracting heat from said vapor to condense the latter in part by transferring heat from said vapor to the body of oil not undergoing dehydration, and after said one body of oil is dehydrated similarly treating the other body of oil and replacing the dehydrated body of oil by a fresh body of wet oil and repeating the operation.

2. Oil dehydrating apparatus comprising in combination two storage tanks each having associated therewith a vapor space from which heat is transferred to the oil in the tank, an oil heater, a pump supplying oil thereto, an expansion chamber, a back pressure valve through which the heater outlet is connected to the expansion chamber and connections whereby said pump may draw oil exclusively from either of said tanks, and whereby oil from said expansion chamber may be returned to the tank from which the pump is drawing, and provisions for passing vapor from the expansion chamber optionally to either or both of said vapor spaces.

3. Oil dehydrating apparatus comprising in combination two storage tanks each having associated therewith a vapor space from which heat is transferred to the oil in the tank, an oil heater, a pump supplying oil thereto, an expansion chamber, a back pressure valve through which the heater outlet is connected to the expansion chamber, and connections whereby said pump may draw oil exclusively from either of said tanks and whereby oil from said expansion chamber may be returned to the tank from which the pump is drawing and provisions for passing vapor from the expansion chamber to the vapor space associated with the tank from which the pump is not drawing.

Signed at New York in the county of New York and State of New York this 25th day of June, A. D. 1923.

JOHN PRIMROSE.